United States Patent
Moon et al.

(10) Patent No.: US 10,194,409 B2
(45) Date of Patent: Jan. 29, 2019

(54) NEAR FIELD COMMUNICATION DEVICE AND AN OPERATING METHOD OF THE NEAR FIELD COMMUNICATION DEVICE

(71) Applicant: SAMSUNG ELECTRONICS CO., LTD., Suwon-si, Gyeonggi-Do (KR)

(72) Inventors: Byeongtaek Moon, Seoul (KR); Jongpil Cho, Hwaseong-si (KR); Junho Kim, Yongin-si (KR); Iljong Song, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/852,997

(22) Filed: Dec. 22, 2017

(65) Prior Publication Data

US 2018/0234929 A1    Aug. 16, 2018

(30) Foreign Application Priority Data

Feb. 16, 2017  (KR) .................. 10-2017-0021218
Mar. 24, 2017  (KR) .................. 10-2017-0037790

(51) Int. Cl.
*H04W 4/80*       (2018.01)
*H04W 56/00*    (2009.01)

(52) U.S. Cl.
CPC ........... *H04W 56/001* (2013.01); *H04W 4/80* (2018.02)

(58) Field of Classification Search
CPC .............................. H04W 56/001; H04W 4/80
USPC ...................................................... 455/41.1
See application file for complete search history.

(56) References Cited

U.S. PATENT DOCUMENTS

| | | | | |
|---|---|---|---|---|
| 6,507,607 B1* | 1/2003 | Hill | ...................... | G06K 7/0008 375/219 |
| 6,734,669 B2* | 5/2004 | Lopez | ................ | G01N 27/9046 324/238 |
| 6,798,197 B2* | 9/2004 | Lopez | ................ | G01N 27/9046 324/238 |
| 6,809,671 B1* | 10/2004 | Lopez | ................ | G01N 27/9046 324/234 |
| 8,706,030 B2 | 4/2014 | Witschnig et al. | | |
| 8,818,282 B2* | 8/2014 | Kim | ...................... | H03L 7/0995 375/327 |

(Continued)

FOREIGN PATENT DOCUMENTS

JP       2009130389        6/2009
JP       2009175976        8/2009
JP          5640655       12/2014

*Primary Examiner* — Hai V Nguyen
(74) *Attorney, Agent, or Firm* — F. Chau & Associates, LLC

(57) ABSTRACT

A near field communication device includes an antenna, a matching circuit connected to the antenna, a clock extraction block that extracts a clock from a signal received by the antenna and outputs the extracted clock, a frequency compensation block that compensates for a frequency of the extracted clock and outputs a compensated clock, and a modulation and amplification block that performs modulation and amplification by using the compensated clock and outputs a transmit signal to the matching circuit. A first extracted clock has a first frequency that is extracted when the transmit signal is not output and a second extracted clock has a second frequency that is extracted when the transmit signal is output, the frequency compensation block compensates for the second frequency of the second extracted clock based on a difference between the first frequency of the first extracted clock and the second frequency of the second extracted clock.

20 Claims, 15 Drawing Sheets

(56) References Cited

U.S. PATENT DOCUMENTS

| | | | | |
|---|---|---|---|---|
| 8,934,836 B2* | 1/2015 | Lefley | ............ | H04B 5/0075 |
| | | | | 340/10.1 |
| 8,934,837 B2* | 1/2015 | Zhu | ............ | H04B 5/02 |
| | | | | 340/568.1 |
| 9,100,058 B2* | 8/2015 | Kanno | ............ | H04B 5/0056 |
| 9,118,357 B2* | 8/2015 | Tseng | ............ | H04B 5/0037 |
| 9,124,413 B2* | 9/2015 | Savoj | ............ | H03L 7/0891 |
| 9,461,481 B2* | 10/2016 | Tseng | ............ | H04B 5/0037 |
| 9,590,701 B2* | 3/2017 | Lee | ............ | H04B 5/0075 |
| 9,934,788 B2* | 4/2018 | Ganeshkumar | ............ | G10L 19/10 |
| 2003/0227288 A1* | 12/2003 | Lopez | ............ | G01N 27/9046 |
| | | | | 324/255 |
| 2004/0066189 A1* | 4/2004 | Lopez | ............ | G01N 27/9046 |
| | | | | 324/238 |
| 2011/0011934 A1* | 1/2011 | Iwamura | ............ | G06K 19/0701 |
| | | | | 235/435 |
| 2012/0242160 A1* | 9/2012 | Tseng | ............ | H04B 5/0037 |
| | | | | 307/104 |
| 2013/0040583 A1* | 2/2013 | Kim | ............ | H03L 7/0995 |
| | | | | 455/84 |
| 2013/0217327 A1* | 8/2013 | Kanno | ............ | H04B 5/0056 |
| | | | | 455/41.1 |
| 2014/0003548 A1* | 1/2014 | Lefley | ............ | H04B 5/0075 |
| | | | | 375/268 |
| 2014/0187153 A1* | 7/2014 | Zhu | ............ | H04B 5/02 |
| | | | | 455/41.1 |
| 2015/0357832 A1* | 12/2015 | Tseng | ............ | H04B 5/0037 |
| | | | | 307/104 |
| 2018/0033445 A1* | 2/2018 | Ganeshkumar | ............ | G10L 19/10 |
| 2018/0226083 A1* | 8/2018 | Ganeshkumar | ............ | G10L 19/10 |

* cited by examiner

| Reader Mode | GT2 | TX2 | RX2 |
|---|---|---|---|
| | Frequency Compensation | | |
| Card Mode | GT1 | RX1 | TX1 |

NEAR FIELD COMMUNICATION DEVICE AND AN OPERATING METHOD OF THE NEAR FIELD COMMUNICATION DEVICE

CROSS-REFERENCE TO RELATED APPLICATIONS

This application claims priority under 35 U.S.C. § 119 to Korean Patent Application Nos. 10-2017-0021218 filed Feb. 16, 2017, and 10-2017-0037790 filed Mar. 24, 2017, in the Korean Intellectual Property Office, the disclosures of which are incorporated by reference herein in their entireties.

TECHNICAL FIELD

Exemplary embodiments of the inventive concept relate to a wireless communication device, and more particularly, to a near field communication device and an operating method thereof.

DISCUSSION OF RELATED ART

Radio frequency identification (RFID) is a communication technique that allows an RFID reader situated at a short range from a card to supply power or a clock to the card and communicate with the card. Near field communication (NFC) is an example of the RFID. The NFC is highly flexible in that one communication device has both a function of the reader and a function of the card.

There may be a difference between a phase of a signal that the NFC device receives and a phase of a transmit signal generated by using the received signal. This phase difference may exist due to an error in the process of manufacturing the NFC device or a design purpose of the NFC device. If a phase difference exists between a receive signal and a transmit signal, communication quality of the NFC device may be degraded.

SUMMARY

According to an exemplary embodiment of the inventive concept, a near field communication (NFC) device includes: an antenna; a matching circuit connected to the antenna; a clock extraction block configured to extract a clock from a signal received by the antenna and to output the extracted clock; a frequency compensation block configured to compensate for a frequency of the extracted clock and to output a compensated clock; and a modulation and amplification block configured to perform modulation and amplification by using the compensated clock and to output a transmit signal to the matching circuit, wherein a first extracted clock has a first frequency that is extracted when the transmit signal is not output and a second extracted clock has a second frequency that is extracted when the transmit signal is output, and wherein the frequency compensation block compensates for the second frequency of the second extracted clock based on a difference between the first frequency of the first extracted clock and the second frequency of the second extracted clock.

According to an exemplary embodiment of the inventive concept, a near field communication device includes: an antenna; a matching circuit connected to the antenna; a clock extraction block configured to extract a clock from a signal of the matching circuit and to output the extracted clock; a frequency compensation block configured to compensate for a frequency of the extracted clock and to output a compensated clock; and a modulation and amplification block configured to perform modulation and amplification by using the compensated clock and to output a transmit signal to the matching circuit and the antenna, wherein the frequency compensation block includes: a frequency detector configured to detect a first frequency of a first extracted clock extracted when the transmit signal is not output and a second frequency of a second extracted clock extracted when the transmit signal is output; a first delay unit configured to increase an amount of delay of the second extracted clock when the second frequency is higher than the first frequency; and a second delay unit configured to decrease an amount of delay of an output clock of the first delay unit when a frequency of the output clock of the first delay unit is lower than the first frequency.

According to an exemplary embodiment of the inventive concept, an operating method of a near field communication device includes: receiving a first signal through an antenna and a matching circuit; extracting a first clock from the first signal; detecting a first frequency of the first clock; transmitting a second signal while the first signal is received; extracting a second clock from the second signal; detecting a second frequency of the second clock; and adjusting an amount of delay of the second clock such that the second frequency corresponds to the first frequency.

BRIEF DESCRIPTION OF THE FIGURES

The above and other features of the inventive concept will become more apparent by describing in detail exemplary embodiments thereof with reference to the following figures, in which.

DETAILED DESCRIPTION OF THE EMBODIMENTS

Figure 1:
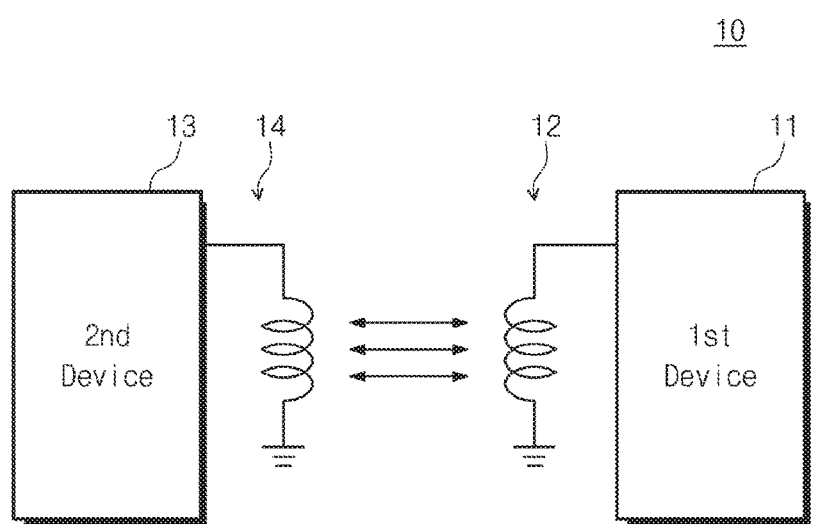
FIG. 1 shows an example of a near field communication system.

Like reference numerals may refer to like parts in the accompanying drawings.

FIG. 1 shows an example of a near field communication (NFC) system 10. Referring to FIG. 1, the NFC system 10 includes first and second NFC devices 11 and 13. The first NFC device 11 is connected with a first antenna 12, and the second NFC device 13 is connected with a second antenna 14.

Each of the first and second NFC devices 11 and 13 may operate in a reader mode or a card mode. For example, the first NFC device 11 may operate in the reader mode, and the second NFC device 13 may operate in the card mode. On the other hand, the first NFC device 11 may operate in the card mode, and the second NFC device 13 may operate in the reader mode. The second NFC device 13 of the reader mode may transmit a first signal to the first NFC device 11 through electromagnetic induction between the first antenna 12 and the second antenna 14. The first signal may include a continuous wave for transmitting a clock and a first information signal. The first information signal may be added to the continuous wave so that the continuous wave can transmit first information.

The first NFC device 11 may obtain a clock from the continuous wave of the first signal. The first NFC device 11 may obtain information from the first information signal of the first signal. The first NFC device 11 may add a second information signal to the continuous wave of the first signal and may transmit the added result to the second NFC device 13. In other words, the first NFC device 11 may add second information to the continuous wave of the first signal. For example, the first NFC device 11 may transmit a second signal to the second NFC device 13 through electromagnetic induction between the first antenna 12 and the second antenna 14.

In an exemplary embodiment of the inventive concept, a center frequency of the NFC may be 13.56 MHz. The center frequency may correspond to an NFC standard, for example. A path delay may occur when the first NFC device 11 receives the first signal and transmits the second signal. The path delay may cause a difference between a phase of the first signal and a phase of the second signal. The phase difference may be determined according to a design purpose or a design process of a manufacturer of the first NFC device 11.

When the first NFC device 11 transmits the second signal, the first signal and the second signal may be mixed in the first antenna 12. If two signals (e.g., continuous waves) having the same frequency and different phases are mixed, a frequency of the mixed signal may be different from a frequency of the first and second signals. In other words, when the first NFC device 11 transmits the second signal, a signal that has a frequency different from the center frequency of the NFC may be transmitted and received through the first antenna 12. If a frequency of a signal in the first antenna 12 is different from the center frequency of the NFC, the first NFC device 11 may fail to communicate with the second NFC device 13 normally.

To prevent a phase difference, the phases of the first signal and the second signal may be measured by using an oscilloscope and an amount of delay of a delay unit within the first NFC device 11 may be adjusted. However, if this method is used, a person may have to measure a phase difference and make the delay adjustment on all NFC devices. This, however, can be costly and time consuming, especially after the NFC devices have been manufactured.

The NFC devices 11 and 13 according to an exemplary embodiment of the inventive concept, for example, the first NFC device 11 of the card mode, may automatically detect a phase difference between the first signal and the second signal and may automatically adjust the amount of delay depending on the detection result. Accordingly, there is no need to manually measure a phase difference and adjust the amount of delay, thereby reducing manufacturing costs of the NFC devices 11 and 13. In addition, even if a phase difference occurs while the NFC devices 11 and 13 are being used, the phase difference may be automatically corrected by the NFC devices 11 and 13. Accordingly, the communication quality of the NFC devices 11 and 13 may be increased.

Figure 2:
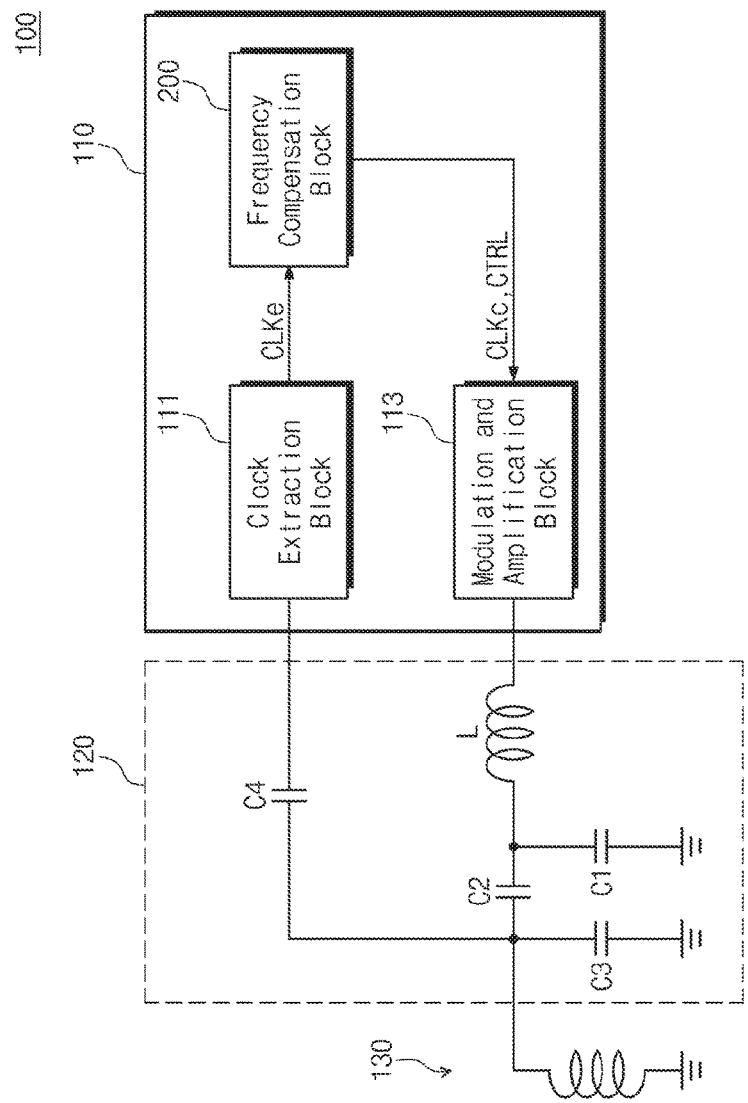
FIG. 2 shows a near field communication device, according to an exemplary embodiment of the inventive concept.

FIG. 2 shows an NFC device 100, according to an exemplary embodiment of the inventive concept. In an exemplary embodiment of the inventive concept, elements, which are associated with transmit and receive functions of the card mode, are illustrated in FIG. 2. Referring to FIG. 2, the NFC device 100 includes a transmitter 110, a matching circuit 120, and an antenna 130.

The transmitter 110 includes a clock extraction block 111, a frequency compensation block 200, and a modulation and amplification block 113.

The clock extraction block 111 may extract a clock CLKe from a signal in the antenna 130 and the matching circuit 120. The extracted clock CLKe may have the same frequency as a frequency of the signal in the antenna 130 and the matching circuit 120. The extracted clock CLKe may be provided to the frequency compensation block 200.

The frequency compensation block 200 may receive the extracted clock CLKe from the clock extraction block 111. When the NFC device 100 does not transmit a signal, the frequency compensation block 200 may store information about the frequency of the extracted clock CLKe as first frequency information. When the NFC device 100 transmits a signal, the frequency compensation block 200 may detect information about a frequency of the extracted clock CLKe as second frequency information. The frequency compensation block 200 may compare the first frequency information and the second frequency information and may adjust the amount of delay depending on the comparison result.

If a phase difference exists between a first signal received from an external device (e.g., a NFC device of the reader mode) and a second signal that the NFC device 100 transmits, a frequency of a signal formed in the antenna 130 and the matching circuit 120 may be different from a frequency of the first signal and the second signal. In other words, if there is a phase difference between the first signal and the second signal, the first frequency information when the first signal is received and the second signal is not transmitted may be different from the second frequency information when the first signal is received and the second signal is transmitted.

If the second frequency information is the same as the first frequency information while the first signal is received and the second signal is transmitted, phases of the first signal and the second signal may be the same each other. The frequency compensation block 200 may adjust the amount of delay such that the second frequency information is the same as the first frequency information while the first signal is received and the second signal is transmitted.

For example, the same frequency information may mean that the second frequency is the same as the first frequency, or that the second frequency is similar to the first frequency within a certain allowable error range. For example, the certain allowable error range may result from a resolution processing the frequency or the frequency information of at least one element of the NFC device 100.

For example, the frequency compensation block 200 may adjust the amount of delay gradually and adaptively. The frequency compensation block 200 may perform a hierarchical (or stepwise) delay. The stepwise delay may include, for example, a first delay delaying the amount of delay by a first unit and a second delay adjusting the amount of delay by a second unit smaller than the first unit.

The frequency compensation block 200 may output a result of adjusting the amount of delay as a compensated clock CLKc. The frequency compensation block 200 may provide the modulation and amplification block 113 with a control signal CTRL such that the modulation and amplification block 113 transmits a signal for adjusting the amount of delay.

The modulation and amplification block 113 may receive the compensated clock CLKc from the frequency compensation block 200. In a communication mode, the modulation and amplification block 113 may modulate the compensated clock CLKc by using an information signal to be transmitted. The information signal may be received from a processor (e.g., an application processor 1010 of FIG. 19). The modulation and amplification block 113 may amplify the modulated signal and may provide the amplified signal to the matching circuit 120 and the antenna 130.

The matching circuit 120 may perform impedance matching on the antenna 130. The matching circuit 120 includes an inductor L and first to fourth capacitors C1 to C4. A first end of the inductor L is connected to an output of the modulation and amplification block 113, and a second end of the conductor L is connected to first ends of the first and second capacitors C1 and C2. A second end of the first capacitor C1 is connected to a ground electrode to which a ground voltage is supplied. A second end of the second capacitor C2 is connected first ends of the third and fourth capacitors C3 and C4 and the antenna 130. A second end of the third capacitor C3 is connected to the ground electrode. A second end of the fourth capacitor C4 is connected to the clock extraction block 111 of the transmitter 110.

Figure 3:
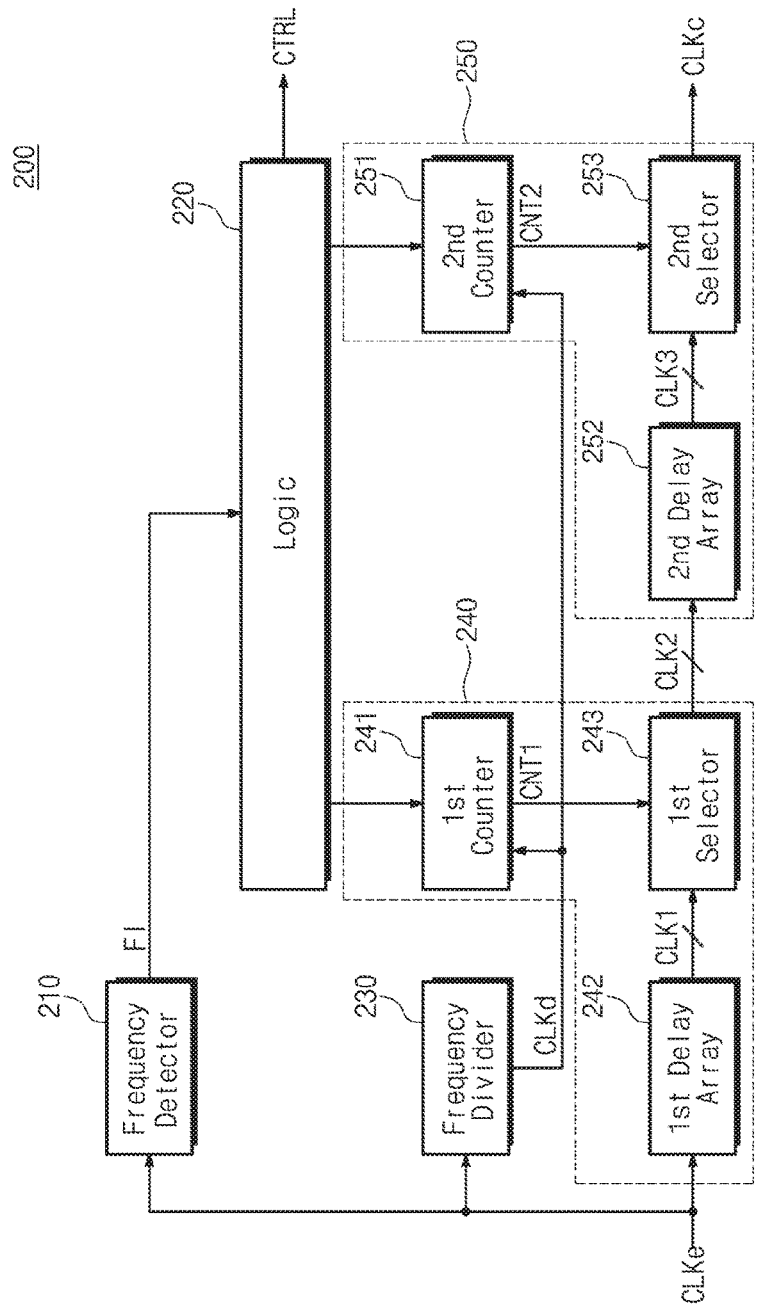
FIG. 3 is a block diagram illustrating a frequency compensation block, according to an exemplary embodiment of the inventive concept.

FIG. 3 is a block diagram illustrating the frequency compensation block 200, according to an exemplary embodiment of the inventive concept. Referring to FIGS. 2 and 3, the frequency compensation block 200 includes a frequency detector 210, logic 220, a frequency divider 230, a first delay unit 240, and a second delay unit 250.

The frequency detector 210 may receive the extracted clock CLKe and may detect a frequency of the extracted clock CLKe. The frequency detector 210 may output frequency information FI indicating a frequency of the extracted clock CLKe to the logic 220.

The logic 220 may receive the frequency information FI from the frequency detector 210. The logic 220 may store, as the first frequency information, the frequency information FI when a first signal is received from an external device and a second signal is not transmitted. The logic 220 may control the modulation and amplification block 113 by using the control signal CTRL such that the second signal is transmitted on the basis of the compensated clock CLKc. The second signal may be a continuous wave that does not include an information signal. The logic 220 may detect (or store), as the second frequency information, the frequency information FI when the first signal is received and the second signal is transmitted. The logic 220 may control the first and second delay units 240 and 250 to allow the second frequency information to be the same as the first frequency information while the first signal is received and the second signal is transmitted.

The frequency divider 230 may receive the extracted clock CLKe. The frequency divider 230 may divide the extracted clock CLKe and may output a divided clock CLKd. The divided clock CLKd may be provided to the first and second delay units 240 and 250.

The first delay unit 240 may adjust the amount of delay by the first unit under control of the logic 220. For example, when the second frequency information indicates that a second frequency is higher than a first frequency that the first frequency information indicates, the first delay unit 240 may increase (or decrease over 180 degrees) the amount of delay under control of the logic 220. The first delay unit 240 may iteratively increase the amount of delay by the first unit until the second frequency is lower than the first frequency. The first delay unit 240 includes a first counter 241, a first delay array 242, and a first selector 243.

The first counter 241 may operate in synchronization with the divided clock CLKd. The first counter 241 may adjust (e.g., increase, decrease, or maintain) a count value under control of the logic 220. The first counter 241 may output the count value as a first count CNT1.

The first delay array 242 may include a plurality of delays connected in series to each other. The first delay array 242 may output the extracted clock CLKe and output clocks of the plurality of delays as first clocks CLK1.

The first selector 243 may receive the first count CNT1 and the first clocks CLK1. The first selector 243 may select a clock, which corresponds to the first count CNT1, from among the first clocks CLK1. The first selector 243 may output the selected clock as a second clock CLK2.

When the second frequency is higher than the first frequency, the first counter 241 may increase (or decrease) the first count CNT1 under control of the logic 220. If the first count CNT1 of the first counter 241 increases (or decreases), the first selector 243 may select a clock, which is delayed more (or delayed less) by the first unit, from among the first clocks CLK1 as the second clock CLK2. For example, the first selector 243 may select a clock that is delayed more (or delayed less) by a delay than a previously selected clock. When the second frequency is lower than the first frequency, the first counter 241 may maintain the first count CNT1 under control of the logic 220. If the first counter 241 maintains the first count CNT1, the first selector 243 may maintain a clock currently selected as the second clock CLK2.

The second delay unit 250 may adjust the amount of delay by the second unit smaller than the first unit under control of the logic 220. For example, when the second frequency information indicates that the second frequency is lower than the first frequency that the first frequency information indicates, the second delay unit 250 may increase (or decrease over 180 degrees) the amount of delay under control of the logic 220. The second delay unit 250 may iteratively increase the amount of delay by the second unit until the second frequency is the same as the first frequency (or until a difference is within an allowable error range). The second delay unit 250 includes a second counter 251, a second delay array 252, and a second selector 253.

The second counter 251 may operate in synchronization with the divided clock CLKd. The second counter 251 may adjust (e.g., increase, decrease, or maintain) a count value under control of the logic 220. The second counter 251 may output the count value as a second count CNT2.

The second delay array 252 may include a plurality of delays connected in series to each other. The second delay array 252 may output the second clock CLK2 and output clocks of the plurality of delays as third clocks CLK3.

The second selector 253 may receive the second count CNT2 and the third clocks CLK3. The second selector 253 may select a clock, which corresponds to the second count CNT2, from among the third clocks CLK3. The second selector 253 may output the selected clock as the compensated clock CLKc.

When the second frequency is lower than the first frequency, the second counter 251 may increase (or decrease) the second count CNT2 under control of the logic 220. If the second count CNT2 of the second counter 251 increases (or decreases), the second selector 253 may select a clock, which is advanced more (or advanced less) by the second unit, from among the third clocks CLK3 as the compensated clock CLKc. For example, the second selector 253 may select a clock that is delayed less (or delayed more) by a delay than a previously selected clock. When the second frequency is the same as the first frequency (or if a difference is within an allowable error range), the second counter 251 may maintain the second count CNT2 under control of the logic 220. If the second counter 251 maintains the second count CNT2, the second selector 253 may maintain a clock currently selected as the compensated clock CLKc.

In an exemplary embodiment of the inventive concept, the frequency detector 210 may include a low pass filter. The frequency information is valid when the low pass filter enters a steady state from a transient state. If the first and second counters 241 and 251 operate in synchronization with the extracted clock CLKe, the logic 220 may adjust the first and second counts CNT1 and CNT2 in response to the frequency information FI when the low pass filter of the frequency detector 210 is in the transient state. The first and second counters 241 and 251 may be synchronized with the divided clock CLKd such that the logic 220 adjusts the first and second counts CNT1 and CNT2 in response to the frequency information FI after the low pass filter of the frequency detector 210 enters the steady state.

In an exemplary embodiment of the inventive concept, the divider 230 may be removed if the frequency detector 210 does not use a filter or uses a filter that enters the steady state during a period of the extracted clock CLKe.

Figure 4:
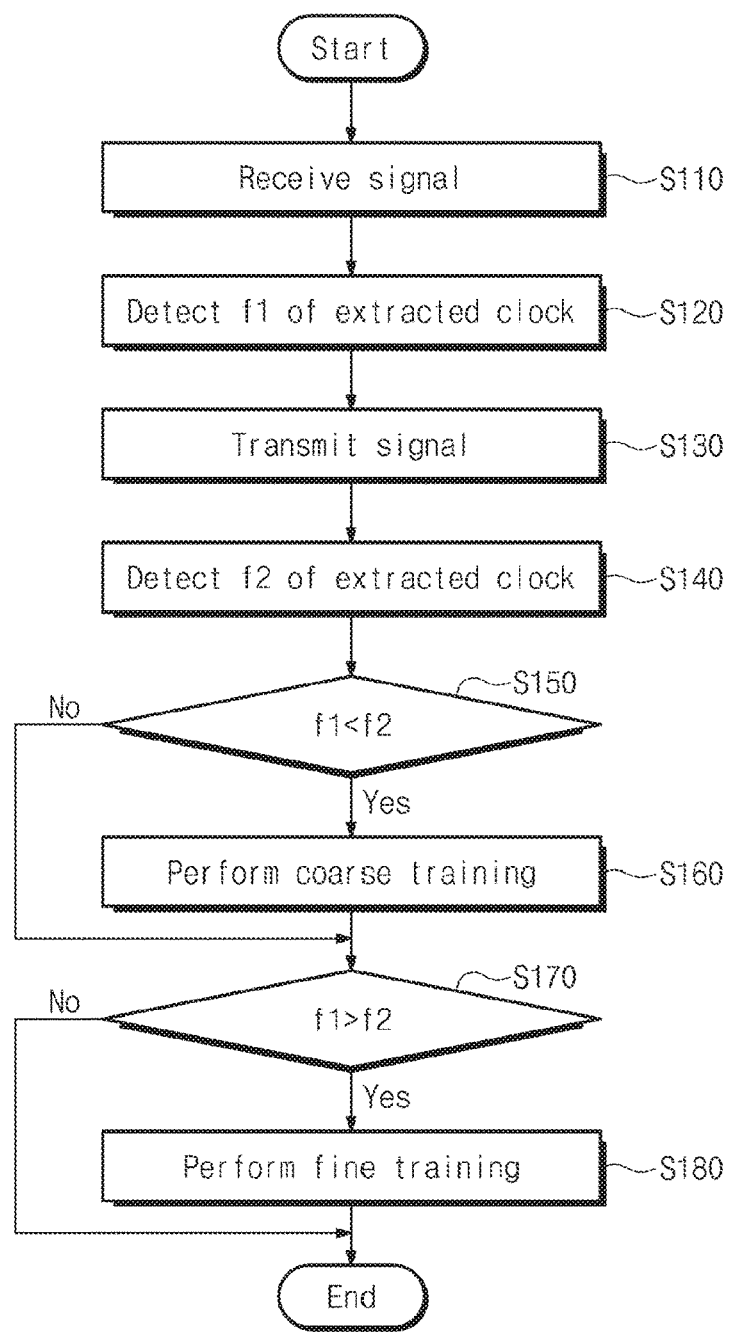
FIG. 4 is a flowchart illustrating an operating method of a near field communication device, according to an exemplary embodiment of the inventive concept.

FIG. 4 is a flowchart illustrating an operating method of the NFC device 100, according to an exemplary embodiment of the inventive concept. Referring to FIGS. 2, 3, and 4, in operation S110, a first signal may be received from the antenna 130 and the matching circuit 120. The first signal may be received from another NFC device of the reader mode. If the first signal is received, the clock extraction block 111 may output the extracted clock CLKe.

In operation S120, the frequency detector 210 may detect a first frequency f1 of the extracted clock CLKe and may output the frequency information FI indicating the first frequency f1. The logic 220 may store, as first frequency information, the frequency information FI when the first signal is received and a second signal is not transmitted.

In operation S130, the logic 220 may control the modulation and amplification block 113 by using the control signal CTRL such that the second signal is transmitted. The second signal may be a continuous wave that does not include an information signal and is synchronized with the compensated clock CLKc.

In operation S140, the frequency detector 210 may detect a second frequency f2 of the extracted clock CLKe and may output the frequency information FI indicating the second frequency f2. The logic 220 may detect (or store), as second frequency information, the frequency information FI when the first signal is received and the second signal is transmitted.

In operation S150, the logic 220 of the frequency compensation block 200 determines whether the first frequency f1 is lower than the second frequency f2. If the first frequency f1 is lower than the second frequency f2, in operation S160, the frequency compensation block 200 may perform coarse training. The coarse training may include increasing the amount of delay by using the first delay unit 240 until the second frequency is lower than the first frequency. If the first frequency f1 is not lower than the second frequency f2, the coarse training may be omitted. In other words, the coarse training may not be performed.

After the coarse training is performed or after the coarse training is omitted (e.g., bypassed), in operation S170, the logic 220 may determine whether the first frequency f1 is higher than the second frequency f2. For example, the logic 220 may determine whether the first frequency f1 is higher than the second frequency f2 by more than an allowable error range. If the first frequency f1 is higher than the second frequency f2, in operation S180, fine training is performed. The fine training may include decreasing the amount of delay by using the second delay unit 250 until the second frequency f2 is lower than the first frequency f1 (or until a difference is within an allowable error range). If the first frequency f1 is not higher than the second frequency f2 (or if a difference is within the allowable error range), the fine training may be omitted. In other words, the fine training may not be performed.

After the fine training is performed or after the fine training is omitted (e.g., bypassed), the logic 220 may control the modulation and amplification block 113 by using the control signal CTRL to stop transmitting the second signal. Afterwards, the NFC device 100 may perform normal communication with another NFC device of the reader mode by using the compensated clock CLKc.

According to an exemplary embodiment of the inventive concept, the NFC device 100 may automatically detect the amount of delay to compensate for a phase difference between the first signal and the second signal when communicating with an NFC device of the reader mode.

Figure 5:
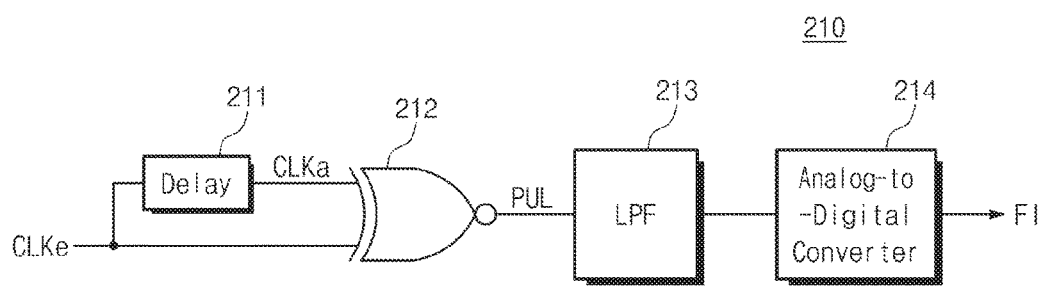
FIG. 5 is a block diagram illustrating a frequency detector, according to an exemplary embodiment of the inventive concept.

FIG. 5 is a block diagram illustrating the frequency detector 210, according to an exemplary embodiment of the inventive concept. Referring to FIGS. 3 and 5, the frequency detector 210 includes a delay 211, a logic operator 212, a low pass filter (LPF) 213, and an analog-to-digital converter 214.

The delay 211 may receive the extracted clock CLKe. The delay 211 may delay the extracted clock CLKe and may output a delayed clock CLKa. For example, the delay 211 may delay the extracted clock CLKe by the amount of delay that is smaller than half the period of the extracted clock CLKe.

The logic operator 212 may receive the extracted clock CLKe and the delayed clock CLKa. The logic operator 212 may perform an XNOR operation on the extracted clock CLKe and the delayed clock CLKa. The operation result of the logic operator 212 may be output as a pulse signal PUL.

The low pass filter 213 may perform low pass filtering on the pulse signal PUL. For example, the low pass filter 213 may extract a direct current (DC) component of the pulse signal PUL. The low pass filter 213 may output the extracted DC component as a DC voltage VDC.

The analog-to-digital converter 214 may convert the DC voltage VDC to a digital value. The analog-to-digital converter 214 may output the converted digital value as the frequency information FI.

Figure 6:
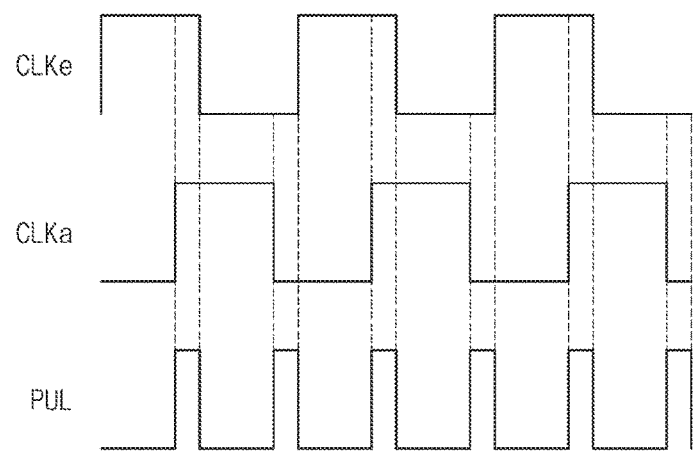
FIG. 6 shows an extracted clock, a delayed clock, and a pulse signal, according to an exemplary embodiment of the inventive concept.

FIG. 6 shows the extracted clock CLKe, the delayed clock CLKa, and the pulse signal PUL, according to an exemplary embodiment of the inventive concept. Referring to FIGS. 5 and 6, the delayed clock CLKa may have a phase difference, which is smaller than half a period, with respect to the extracted clock CLKe. If the XNOR operation is performed on the extracted clock CLKe and the delayed clock CLKa, there is generated the pulse signal PUL corresponding to an interval in which the extracted clock CLKe and the delayed clock CLKa overlap each other.

Figure 7:
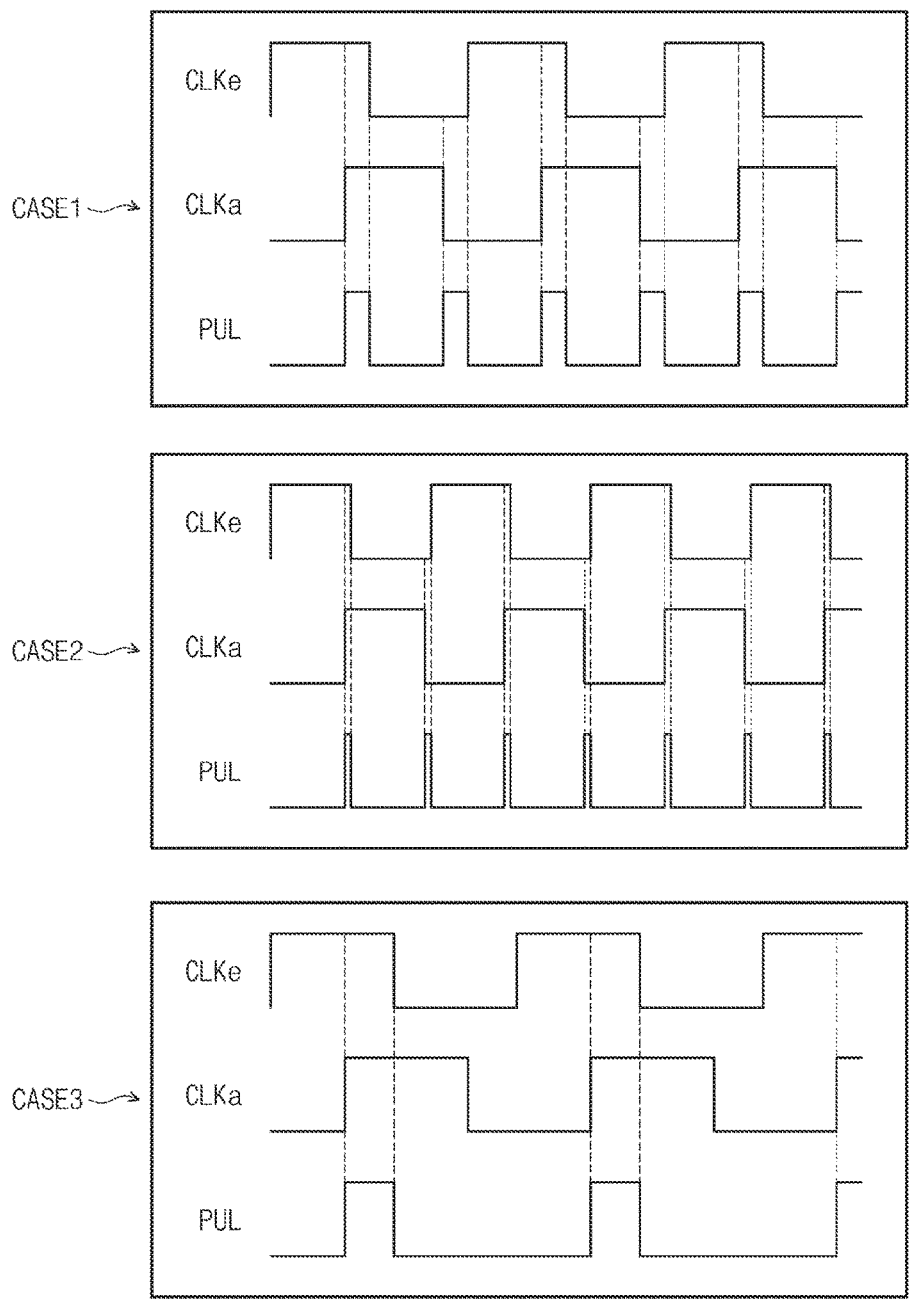
FIG. 7 shows the extracted clock, the delayed clock, and the pulse signal varying due to a difference between frequencies, according to an exemplary embodiment of the inventive concept.

FIG. 7 shows the extracted clock CLKe, the delayed clock CLKa, and the pulse signal PUL varying according to a difference between frequencies, according to an exemplary embodiment of the inventive concept. A first case CASE1 of FIG. 7 may be the same as the example illustrated in FIG. 6. In the first case CASE1, the DC voltage VDC may be calculated according to the following equation 1.

$$VDC = \frac{A \cdot K}{TP} = A(1 - 2d \cdot f)$$  [Equation 1]

In equation 1, a variable "A" indicates an amplitude of the pulse signal PUL, a variable "K" indicates a pulse width of the pulse signal PUL, a variable "TP" indicates a period of the pulse signal PUL, in other words, half a period of the extracted clock CLKe or the delayed clock CLKa. A variable "d" indicates a period of the extracted clock CLKe or the delayed clock CLKa, and a variable "f" indicates a frequency of the extracted clock CLKe or the delayed clock CLKa.

An example in which a frequency of the extracted clock CLKe increases compared with the first case CASE1 of FIG. 7 is illustrated in a second case CASE2 of FIG. 7. If the frequency of the extracted clock CLKe increases, periods of the extracted clock CLKe and the delayed clock CLKa decrease. If it is assumed that a frequency of the first case CASE1 is the first frequency f1 and a frequency of the second case CASE2 is the second frequency f2, a difference between the DC voltage VDC of the first case CASE1 and a DC voltage of the second case CASE2 may be calculated by the following equation 2.

$$2A \cdot d(f2 - f1)$$  [Equation 2]

According to equation 2, when the second frequency f2 is higher than the first frequency f1, the VDC difference may be a positive value. Accordingly, the DC voltage VDC of the second case CASE2 is larger than the DC voltage of the first case CASE1.

An example in which a frequency of the extracted clock CLKe decreases compared with the first case CASE1 of FIG. 7 is illustrated in a third case CASE3 of FIG. 7. If the frequency of the extracted clock CLKe decreases, periods of the extracted clock CLKe and the delayed clock CLKa increase. If a frequency of the first case CASE1 is the first frequency f1 and a frequency of the third case CASE3 is the second frequency f2, a difference between the DC voltage VDC of the first case CASE1 and a DC voltage of the third case CASE3 may be calculated by equation 2. According to equation 2, when the second frequency f2 is lower than the first frequency f1, the VDC difference may be a negative value. Accordingly, the DC voltage VDC of the third case CASE3 is smaller than the DC voltage of the first case CASE1.

Figure 8:
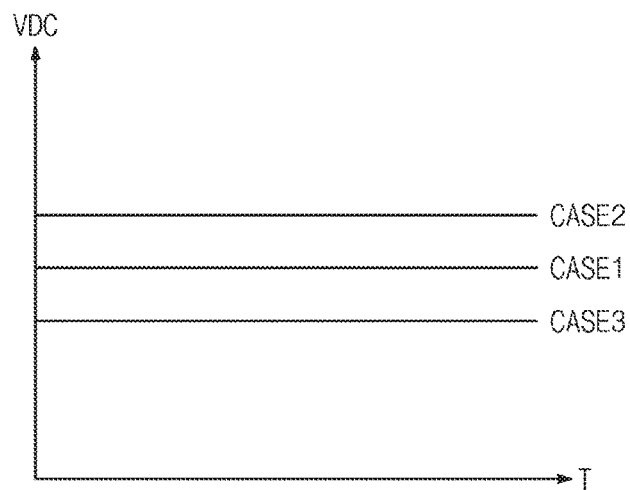
FIG. 8 is a graph illustrating direct current (DC) voltages of first to third cases in FIG. 7, according to an exemplary embodiment of the inventive concept.

FIG. 8 is a graph illustrating an example of DC voltages VDC of the first to third cases CASE1 to CASE3 in FIG. 7, according to an exemplary embodiment of the inventive concept. In FIG. 8, a horizontal axis represents a time T, and a vertical axis represents a DC voltage VDC. Referring to FIGS. 3, 7, and 8, the DC voltage VDC of the second case CASE2 is larger than the DC voltage of the first case CASE1. The DC voltage VDC of the third case CASE3 is smaller than the DC voltage of the first case CASE1. The logic 220 may determine whether the second frequency is higher than or lower than the first frequency, depending on whether a DC voltage of the second signal is larger or smaller than a DC voltage of the first signal. The logic 220 may control the first and second delay units 240 and 250 to allow the DC voltage of the second signal to be the same as the DC voltage of the first signal.

Figure 9:
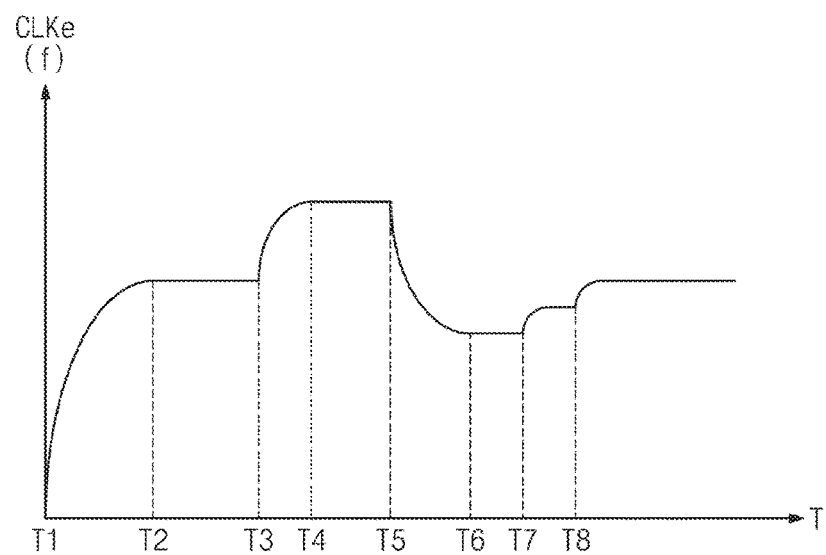
FIG. 9 shows the frequency compensation block performing coarse training and fine training, according to an exemplary embodiment of the inventive concept.

FIG. 9 shows the frequency compensation block 200 performing coarse training and fine training, according to an exemplary embodiment of the inventive concept. In FIG. 9, a horizontal axis represents a time T, and a vertical axis represents the DC voltage VDC indicating a frequency of the extracted clock CLKe. As described with reference to FIG. 7, if the frequency of the extracted clock CLKe increases, a level of the DC voltage VDC increases; if the frequency of the extracted clock CLKe decreases, a level of the DC voltage VDC decreases. Since a frequency of the extracted clock CLKe is proportional to a level of the DC voltage VDC, for ease of description, a description will be given under assumption that a level of the DC voltage VDC is the frequency of the extracted clock CLKe.

Referring to FIGS. 2, 3, and 9, the first signal may start to be received in the antenna 130 and the matching circuit 120 at a first time point T1. If the first signal starts to be received, the clock extraction block 111 may output the extracted clock CLKe. The frequency of the extracted clock CLKe may increase until the first signal is stabilized.

The frequency of the first signal may be stabilized at a second time point T2. Since the frequency of the first signal is stabilized, the frequency of the extracted clock CLKe is also stabilized. If the frequency of the extracted clock CLKe is stabilized, the logic 220 may store the frequency of the extracted clock CLKe as the first frequency f1.

At a third time point T3, the logic 220 may control the modulation and amplification block 113 by using the control signal CTRL such that the second signal is transmitted. If the second signal starts to be transmitted, the first signal and the second signal may be mixed in the antenna 130 and the matching circuit 120. In an exemplary embodiment of the inventive concept, the frequency of the extracted clock CLKe increases if the first signal and the second signal are mixed. A mixed signal of the first signal and the second signal may be stabilized at a fourth time point T4. If the mixed signal is stabilized, the logic 220 may detect (or store) the frequency of the extracted clock CLKe as the second frequency f2.

Since the second frequency f2 is higher than the first frequency f1, the logic 220 controls the first delay unit 240 such that a phase of the extracted clock CLKe is delayed. At a fifth time point T5, the first delay unit 240 may increase the amount of delay of the phase of the extracted clock CLKe under control of the logic 220. In an exemplary embodiment of the inventive concept, the second frequency f2 is lower than the first frequency f1 at a sixth time point T6 as the first delay unit 240 increases the amount of delay of the phase of the extracted clock CLKe by the first unit.

As the second frequency f2 is lower than the first frequency f1, the logic 220 controls the first delay unit 240 such that the current amount of delay is fixed. In addition, the logic 220 may control the second delay unit 250 such that the amount of delay of the phase of the second clock CLK2 decreases. At a seventh time point T7, the second delay unit 250 may decrease the amount of delay of the phase of the second CLK2 by the second unit smaller than the first unit.

Even though the amount of delay decreases at the seventh time point T7, the second frequency f2 may still be lower than the first frequency f1. The logic 220 may control the second delay unit 250 such that the amount of delay of the phase of the second clock CLK2 further decreases. At an eighth time point T8, the second delay unit 250 may decrease the amount of delay of a phase of the second clock CLK2 by the second unit smaller than the first unit.

As the amount of delay decreases at the eighth time point T8, the second frequency f2 may be the same as the first frequency f1. Accordingly, the logic 220 may control the second delay unit 250 such that the current amount of delay is fixed.

If the amount of delays of the first and second delay units 240 and 250 are adjusted by the logic 220, the second frequency f2 may be the same as the first frequency f1. Accordingly, a phase of the first signal may be the same as a phase of the second signal, and the communication quality of the NFC device 100 may be increased.

In an exemplary embodiment of the inventive concept, a level of the DC voltage VDC may increase from a low level to a high level upon measuring the first frequency f1. Due to an operating characteristic of the analog-to-digital converter 214 (refer to FIG. 5), a digital value of the DC voltage VDC increasing from the low level to a specific level may be different from a digital value of the DC voltage VDC decreasing from the high level to the specific level. According to an exemplary embodiment of the inventive concept, through the coarse training of the first delay unit 240, a level of the DC voltage VDC is adjusted to be lower than a level corresponding to the first frequency f1. Afterwards, through the fine training of the second delay unit 250, the amount of delay is adjusted while increasing a level of the DC voltage VDC. Since a digital value of the DC voltage VDC corresponding to the first frequency f1 and a digital value of the DC voltage VDC upon adjusting the amount of delay are measured under the same condition (e.g., an increase from the low level to the specific level), it is possible to prevent an error from occurring in the analog-to-digital converter 214. Accordingly, the amount of delay of the phase of the extracted clock CLKe may be adjusted more finely.

Figure 10:
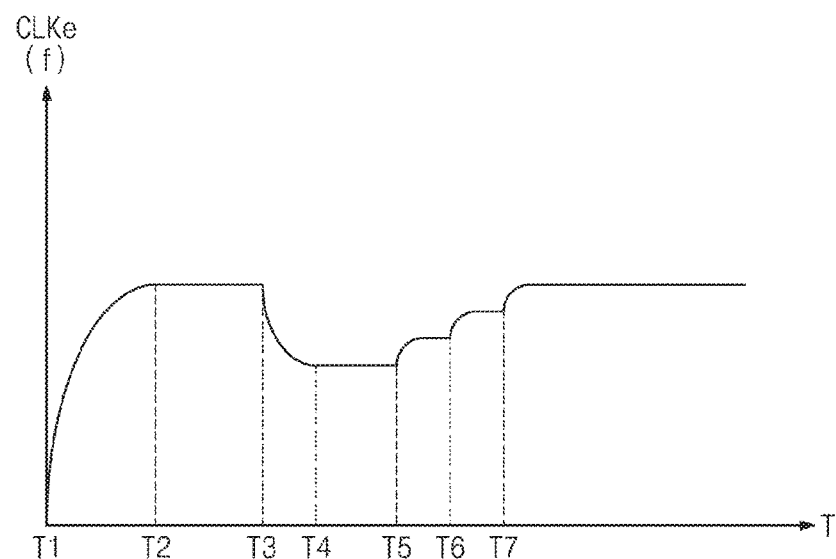
FIG. 10 shows the frequency compensation block performing fine training, according to an exemplary embodiment of the inventive concept.

FIG. 10 shows the frequency compensation block 200 performing a fine training, according to an exemplary embodiment of the inventive concept. In FIG. 10, a horizontal axis represents a time T, and a vertical axis represents the DC voltage VDC corresponding to a frequency of the extracted clock CLKe.

Referring to FIGS. 2, 3, and 10, the first signal may start to be received in the antenna 130 and the matching circuit 120 at a first time point T1. If the first signal starts to be received, the clock extraction block 111 may output the extracted clock CLKe. The frequency of the extracted clock CLKe may increase until the first signal is stabilized.

The frequency of the first signal may be stabilized at a second time point T2. Since the frequency of the first signal is stabilized, the frequency of the extracted clock CLKe is also stabilized. If the frequency of the extracted clock CLKe is stabilized, the logic 220 may store the frequency of the extracted clock CLKe as the first frequency f1.

At a third time point T3, the logic 220 may control the modulation and amplification block 113 by using the control signal CTRL such that the second signal is transmitted. If the second signal starts to be transmitted, the first signal and the second signal may be mixed in the antenna 130 and the matching circuit 120. In an exemplary embodiment of the inventive concept, the frequency of the extracted clock CLKe decreases if the first signal and the second signal are mixed. A mixed signal of the first signal and the second signal may be stabilized at a fourth time point T4. If the mixed signal is stabilized, the logic 220 may detect (or store) the frequency of the extracted clock CLKe as the second frequency f2.

Since the second frequency f2 is lower than the first frequency f1, the logic 220 controls the first delay unit 240 such that the amount of delay of a phase of the extracted clock CLKe is fixed. In addition, the logic 220 may control the second delay unit 250 such that the amount of delay of the phase of the second clock CLK2 decreases. At a fifth time point T5, a sixth time point T6, and a seventh time point T7, the second delay unit 250 may sequentially decrease the amount of delay of the phase of the second clock CLK2 by the second unit smaller than the first unit.

As the amount of delay decreases at the fifth, sixth and seventh time points T5, T6 and T7, the second frequency f2 may be the same as the first frequency f1. Accordingly, the logic 220 may control the second delay unit 250 such that the current amount of delay is fixed.

Figure 11:
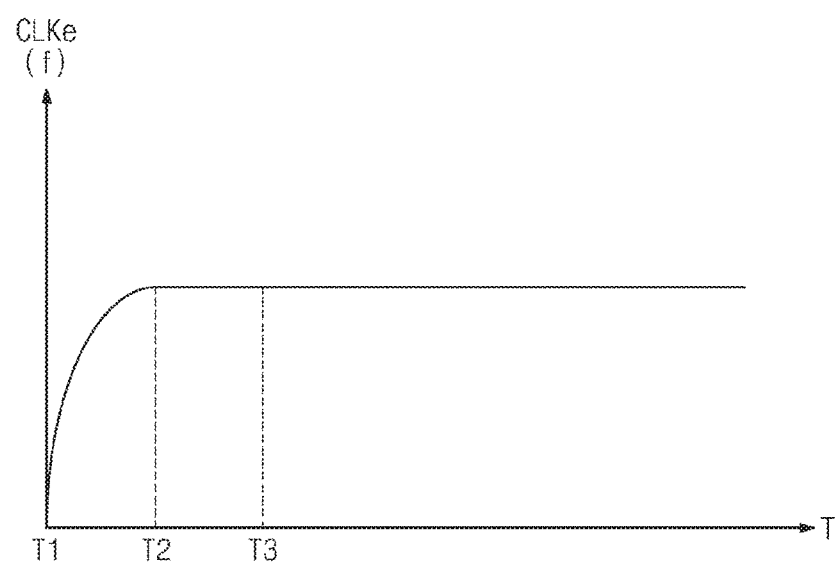
FIG. 11 shows the frequency compensation block of FIG. 10 not performing training, according to an exemplary embodiment of the inventive concept.

FIG. 11 shows the frequency compensation block 200 not performing training, according to an exemplary embodiment of the inventive concept. In FIG. 11, a horizontal axis represents a time T, and a vertical axis represents the DC voltage VDC corresponding to a frequency of the extracted clock CLKe.

Referring to FIGS. 2, 3, and 11, the first signal may start to be received in the antenna 130 and the matching circuit 120 at a first time point T1. If the first signal starts to be received, the clock extraction block 111 may output the extracted clock CLKe. The frequency of the extracted clock CLKe may increase until the first signal is stabilized.

The frequency of the first signal may be stabilized at a second time point T2. Since the frequency of the first signal is stabilized, the frequency of the extracted clock CLKe is also stabilized. If the frequency of the extracted clock CLKe is stabilized, the logic 220 may store the frequency of the extracted clock CLKe as the first frequency f1.

At a third time point T3, the logic 220 may control the modulation and amplification block 113 by using the control signal CTRL such that the second signal is transmitted. If the second signal starts to be transmitted, the first signal and the second signal may be mixed in the antenna 130 and the matching circuit 120. In an exemplary embodiment of the inventive concept, the frequency of the extracted clock CLKe does not increase or decrease if the first signal and the second signal are mixed. The logic 220 may detect (or store) the frequency of the extracted clock CLKe as the second frequency f2.

Since the second frequency f2 is not higher than the first frequency f1, the logic 220 controls the first delay unit 240 such that the amount of delay of the phase of the extracted clock CLKe is fixed. Since the second frequency f2 is not lower than the first frequency f1, the logic 220 controls the second delay unit 250 such that the amount of delay of the phase of the second clock CLK2 is fixed.

Figures 12, 13:
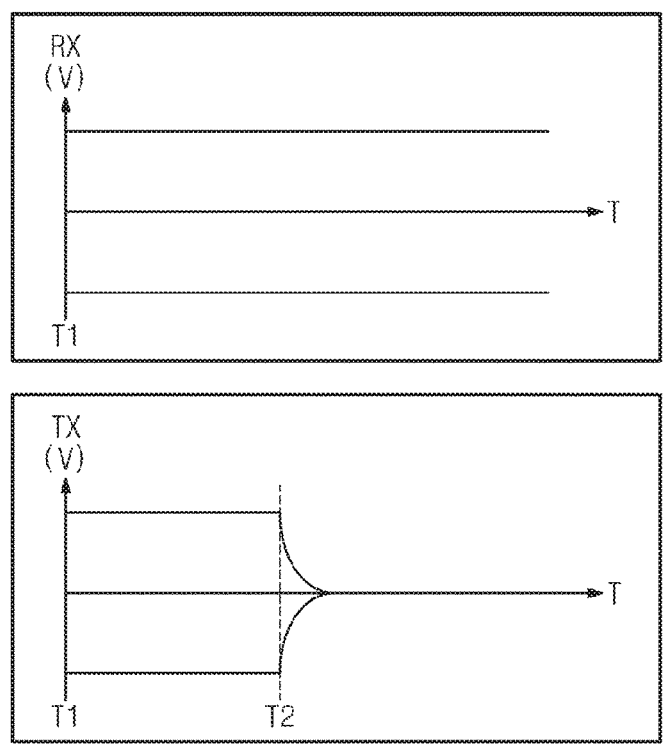
FIG. 12 shows a communication sequence of the near field communication device, according to an exemplary embodiment of the inventive concept.
FIG. 13 shows a receive signal and a transmit signal of the near field communication device, according to an exemplary embodiment of the inventive concept.

FIG. 12 shows a communication sequence of the NFC device 100, according to an exemplary embodiment of the inventive concept. Referring to FIGS. 1, 2, and 12, a communication sequence of the first NFC device 11 of the card mode includes a first guard time sequence GT1, a first receive sequence RX1, and a first transmit sequence TX1. A communication sequence of the second NFC device 13 of the reader mode includes a second guard time sequence GT2, a second transmit sequence TX2, and a second receive sequence RX2.

During the first and second guard time sequences GT1 and GT2, the second NFC device 13 of the reader mode may provide a continuous wave to the first NFC device 11 of the card mode. The first NFC device 11 may extract a clock CLKe from the continuous wave. During the first and second guard time sequences GT1 and GT2, the first NFC device 11 may perform frequency compensation according to an exemplary embodiment of the inventive concept. For example, the first NFC device 11 may store the first frequency f1 and may transmit a continuous wave. During the transmission of the continuous wave, the first NFC device 11 may measure the second frequency f2 and may adjust the second frequency f2 such that the second frequency f2 is the same as the first frequency f1. If the second frequency f2 is completely adjusted such that it matches the first frequency f1, the first NFC device 11 may stop transmitting the continuous wave.

During the first receive sequence RX1 and the second transmit sequence TX2, the second NFC device 13 of the reader mode may add an information signal to the continuous wave and may provide that continuous wave to the first NFC device 11 of the card mode.

During the first transmit sequence TX1 and the second receive sequence RX2, the first NFC device 11 of the card mode may add an information signal to the continuous wave and may provide that continuous wave to the second NFC device 13 of the reader mode.

FIG. 13 shows a receive signal RX and a transmit signal TX of the NFC device 100, according to an exemplary embodiment of the inventive concept. In FIG. 13, a horizontal axis represents a time T, and a vertical axis represents amplitudes of the receive signal RX and the transmit signal TX. The unit of the vertical axis may be a voltage "V".

For brevity of illustration, the receive signal RX and the transmit signal TX are illustrated in FIG. 13 as having a uniform level. However, the receive signal RX and the transmit signal TX may be sine waves. Lines indicating the receive signal RX and the transmit signal TX illustrated in FIG. 13 may be an envelope of a sine wave.

Referring to FIGS. 2 and 13, at a first time point T1, the receive signal RX and the transmit signal TX may coexist. For example, the NFC device 100 may receive a continuous wave as the receive signal RX from an NFC device of the reader mode. At the same time, the NFC device 100 may transmit the transmit signal TX by using the clock CLKe extracted from the receive signal RX and the compensated clock CLKc. A mixed signal of the receive signal RX and the transmit signal TX may exist in the antenna 130 and the matching circuit 120.

At a second time point T2, the NFC device 100 may stop transmitting the transmit signal TX. In the antenna 130 and the matching circuit 120, a residual component of the transmit signal TX may be quickly suppressed by the receive signal RX.

Figure 14:
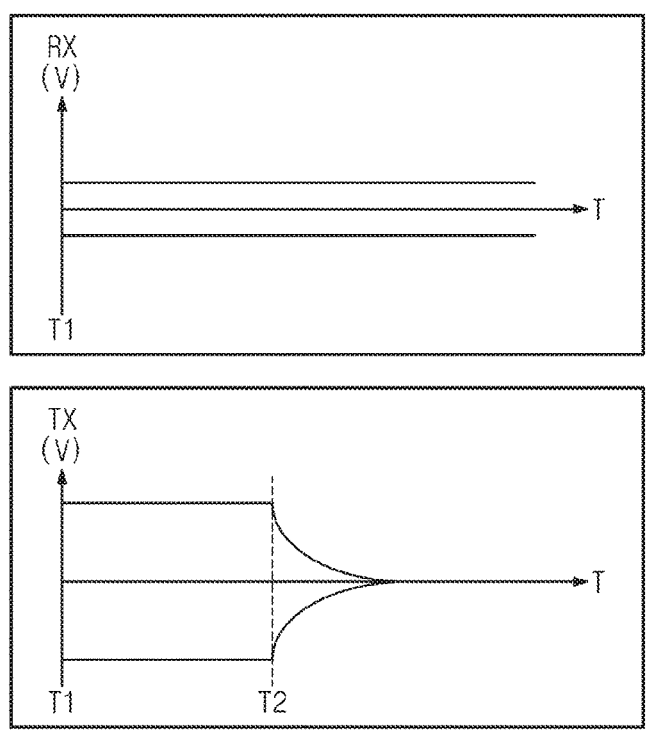
FIG. 14 shows the receive signal and the transmit signal of the near field communication device, according to an exemplary embodiment of the inventive concept.

FIG. 14 shows another example of a receive signal RX and a transmit signal TX of the NFC device 100, according to an exemplary embodiment of the inventive concept. In FIG. 14, a horizontal axis represents a time T, and a vertical axis represents amplitudes of the receive signal RX and the transmit signal TX. The unit of the vertical axis may be a voltage "V".

An amplitude of the receive signal RX may decrease compared with FIG. 13. In contrast, through the amplification of the modulation and amplification block 113 (refer to FIG. 2), an amplitude of the transmit signal TX may be larger than an amplitude of the receive signal RX.

Referring to FIGS. 2 and 14, at a first time point T1, the receive signal RX and the transmit signal TX may coexist. At a second time point T2, the NFC device 100 may stop transmitting the transmit signal TX. Since the amplitude of the receive signal RX is smaller than the amplitude of the transmit signal TX, the suppression degree of the residual component in the transmit signal TX by the receive signal RX may be smaller than that of FIG. 13. In other words, the residual component of the transmit signal TX may exist longer than that of FIG. 13.

Figure 15:
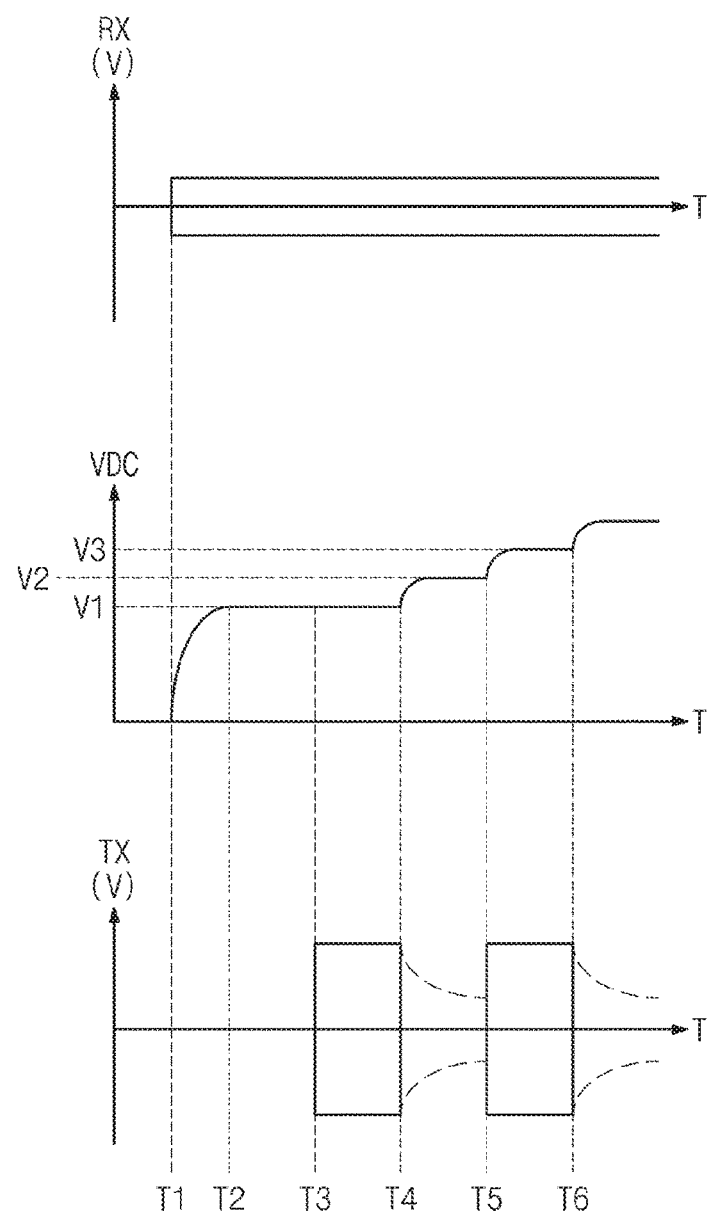
FIG. 15 shows the case when an amplitude of the receive signal is smaller than an amplitude of the transmit signal.

FIG. 15 shows the case when an amplitude of the receive signal RX is smaller than an amplitude of the transmit signal TX. In FIG. 15, a horizontal axis represents a time T. Vertical axes represent an amplitude of the receive signal RX, the DC voltage VDC indicating a frequency of the extracted clock CLKe, and an amplitude of the transmit signal TX, respectively. The unit of the vertical axis may be a voltage "V".

Referring to FIGS. 2, 3, and 15, the receive signal RX may start to be received at a first time point T1. A frequency of the extracted clock CLKe may be stabilized at a second time point T2. For example, the frequency of the extracted clock CLKe may be stabilized to a value corresponding to a first voltage V1. The coarse training or the fine training according to an exemplary embodiment of the inventive concept may be performed between the second time point T2 and a third time point T3. For example, the NFC device 100 may adjust the amount of delay of the extracted clock CLKe and may output the adjusted clock as the compensated clock CLKc. A frequency of the extracted clock CLKe may be adjusted to correspond to the first voltage V1.

From the third time point T3, the NFC device 100 may intermittently transmit the transmit signal TX. For example, the NFC device 100 may start to transmit the transmit signal TX at the third time point T3 and may stop transmitting the transmit signal TX at a fourth time point T4. Since the amplitude of the receive signal RX is smaller than the amplitude of the transmit signal TX, the residual component of the transmit signal TX may exist even though the transmission of the transmit signal TX stops. The residual component of the transmit signal TX is illustrated by a dotted line.

In an exemplary embodiment of the inventive concept, by inductance of the antenna 130 and the matching circuit 120, the residual component of the transmit signal TX may appear as a reverse current. Accordingly, the receive signal RX and the reverse current of the residual component of the transmit signal TX may be mixed in the antenna 130 and the matching circuit 120. A phase of the transmit signal TX may be different from a phase of the reverse current of the residual component of the transmit signal TX. Accordingly, a frequency of the extracted clock CLKe may vary if the reverse current of the residual component of the transmit signal TX is mixed with the receive signal RX. For example, a frequency of the extracted clock CLKe may change to a value corresponding to a second voltage V2.

The NFC device 100 may transmit the transmit signal TX between a fifth time point T5 and a sixth time point T6. The frequency compensation block 200 may delay the extracted clock CLKe by the amount of delay in a time period between the second time point T2 and the third time point T3 to be output as the compensated clock CLKc. If the amount of delay is applied to the frequency of the extracted clock CLKe corresponding to the second voltage V2, the frequency of the extracted clock CLKe may change from a value corresponding to the second voltage V2 to a value corresponding to a third voltage V3.

As described above, if an amplitude of the receive signal RX is low, the frequency of the extracted clock CLKe may be changed to an unintended value due to the residual component of the transmit signal TX. To prevent this from happening, the NFC device 100 according to an exemplary embodiment of the inventive concept may further compensate for a phase that depends on a variation in a frequency.

Figure 16:
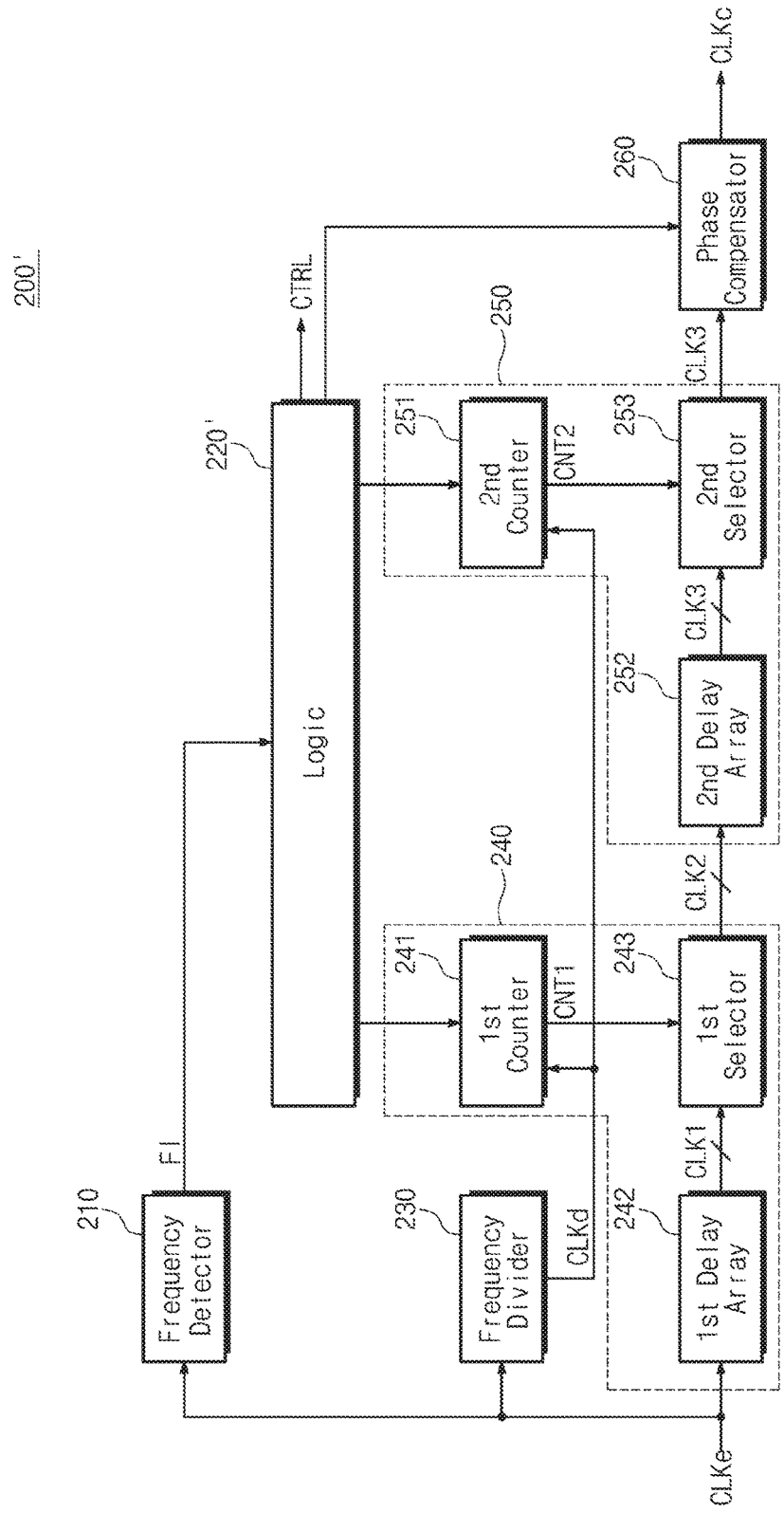
FIG. 16 shows the frequency compensation block of FIG. 3, according to an exemplary embodiment of the inventive concept.

FIG. 16 shows the frequency compensation block 200 of FIG. 3, according to an exemplary embodiment of the inventive concept. Referring to FIGS. 2 and 16, the frequency compensation block 200' includes the frequency detector 210, logic 220', the divider 230, the first delay unit 240, the second delay unit 250, and a phase compensator 260.

The frequency detector 210, the divider 230, the first delay unit 240, and the second delay unit 250 may have the same structure as described with reference to FIG. 3 and may operate the same as described with reference to FIG. 3. A duplicated description is thus omitted.

The logic 220' may be the same as the logic 220 of FIG. 3 except that the logic 220' further controls the phase compensator 260. The logic 220' may track a frequency change of the extracted clock CLKe by using the frequency information FI after determining the amount of delays of the first and second delay units 240 and 250 through the coarse training and the fine training. When the NFC device 100 transmits the second signal (e.g., the transmit signal TX), the logic 220' may control the phase compensator 260 to compensate for a difference between the first frequency f1 stored during training and a frequency of the extracted clock CLKe. For example, when the frequency of the extracted clock CLKe is higher than the first frequency f1, the phase compensator 260 may delay a phase of a third clock CLK3 output from the second selector 253. When the frequency of the extracted clock CLKe is lower than the first frequency f1, the phase compensator 260 may advance the phase of the third clock CLK3 output from the second selector 253.

The magnitude of the amount of delay adjusted according to the magnitude of a frequency difference between the first frequency f1 and the extracted clock CLKe may be variously obtained. For example, the magnitude of the amount of delay adjusted according to the magnitude of the frequency difference may be stored in advance in a lookup table.

For example, the magnitude of the amount of delay adjusted according to the magnitude of the frequency difference may be calculated during training. A frequency difference between the first frequency f1 and the second frequency f2 and the to-be-adjusted amount of delays of the first and second delay units 240 and 250 are obtained during the training. The logic 220' may obtain a relationship between the magnitude of the frequency difference and the magnitude of the amount of delay to be adjusted, based on the frequency difference and the adjusted amount of delays during the training. The logic 220' may select the to-be-adjusted amount of delay of the phase compensator 260 by using the obtained relationship. For example, the phase compensator 260 may have the same structure as the first delay array 242 or the second delay array 252.

For example, the phase compensator 260 may include at least one of the first and second delay units 240 and 250. The logic 220' may control the phase compensator 260 such that the phase compensator 260 compensates for a phase hierarchically (or stepwise) and iteratively.

Figure 17:
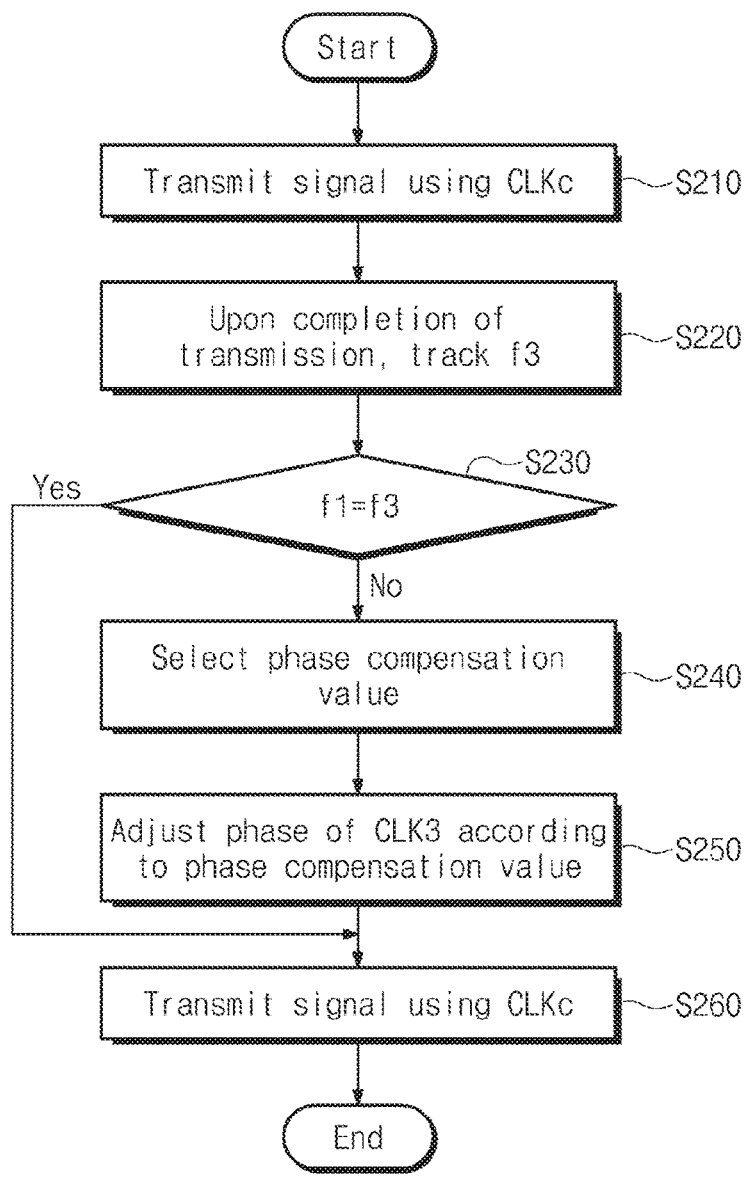
FIG. 17 is a flowchart illustrating an operating method of the near field communication device including the frequency compensation block of FIG. 16, according to an exemplary embodiment of the inventive concept.

FIG. 17 is a flowchart illustrating an operating method of the NFC device 100 including the frequency compensation block 200' of FIG. 16, according to an exemplary embodiment of the inventive concept. Referring to FIGS. 2, 16, and 17, in operation S210, the NFC device 100 may transmit the second signal (e.g., the transmit signal TX) by using the compensated clock CLKc.

In operation S220, after the second signal is completely transmitted, the logic 220' may track a frequency of the extracted clock CLKe with a third frequency f3.

In operation S230, the logic 220' determines whether the first frequency f1 and the third frequency f3 are the same each other (or a difference is within an allowable error range). If the first frequency f1 and the third frequency f3 are the same each other (or a difference is within an allowable error range), in operation S260, the NFC device 100 may transmit a next second signal by using the compensated clock CLKc.

If the first frequency f1 and the third frequency f3 are not the same each other (or having a difference outside of the allowable error range), in operation S240, the logic 220' may select a phase compensation value. The phase compensation value may be determined on the basis of one of the various methods described with reference to FIG. 16. In operation S250, the phase compensator 260 may adjust a phase of the third clock CLK3 depending on the phase compensation value and may output the third clock CLK3 having the adjusted phase as the compensated clock CLKc. Afterwards, in operation S260, the NFC device 100 may transmit a next second signal by using the compensated clock CLKc.

Figure 18:
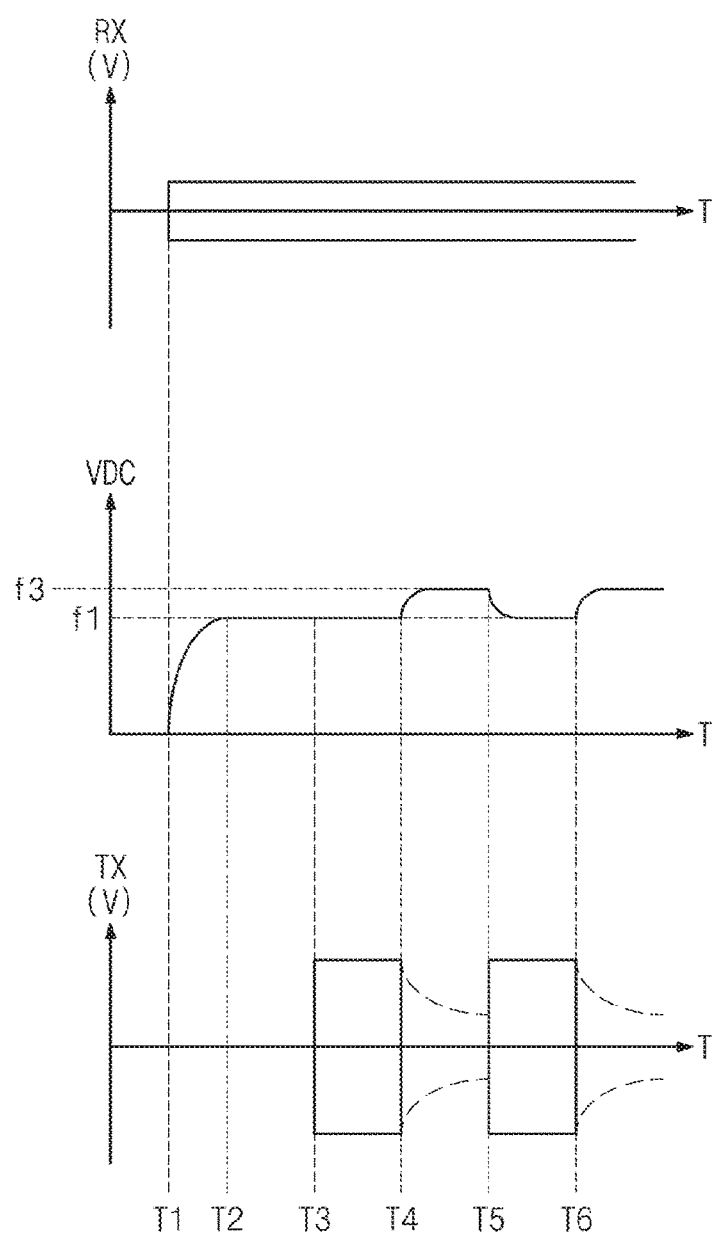
FIG. 18 shows an application example of FIG. 15, in which phase compensation is performed by a phase compensator, according to an exemplary embodiment of the inventive concept.

FIG. 18 shows an application example of FIG. 15, in which phase compensation is performed by the phase compensator 260, according to an exemplary embodiment of the inventive concept. Compared with FIG. 15, when transmitting the transmit signal TX at a fifth time point T5, the frequency compensation block 200' may compensate for the third clock CLK3 by oppositely applying a frequency difference between the first frequency f1 and the third frequency f3 (or a frequency variation). Accordingly, when the transmit signal TX is transmitted between the fifth time point T5 and the sixth time point T6, a frequency of the extracted clock CLKe is adjusted to the first frequency f1.

In an exemplary embodiment of the inventive concept, when the NFC device 100 communicates with a first NFC device of the reader mode, the amount of delays of the first and second delay units 240 and 250 may be determined, and the amount of delay of the phase compensator 260 may be determined. In an exemplary embodiment of the inventive concept, when the NFC device 100 terminates the communication with a first NFC device of the reader mode, the amount of delays of the first and second delay units 240 and 250 may be maintained, and the amount of delay of the phase compensator 260 may be initialized. For example, an initial value of the amount of delay of the phase compensator 260 may be "0" or a multiple of one period of a center frequency. When the NFC device 100 communicates with a second NFC device of the reader mode, the NFC device 100 may maintain the amount of delays of the first and second delay units 240 and 250 and may again calculate the amount of delay of the phase compensator 260.

In an exemplary embodiment of the inventive concept, when the NFC device 100 starts to communicate with the second NFC device of the reader mode, the NFC device 100 may determine whether the amount of delays of the first and second delay units 240 and 250 are correct. For example, to check whether the amount of delay is correct, the NFC device 100 may store a first frequency, detect a second frequency, and compare the second frequency with the first frequency. If the first frequency and the second frequency are the same each other (or a difference between the first frequency and the second frequency is within an allowable error range), it may be determined that the amount of delays of the first and second delay units 240 and 250 are correct. If the amount of delays of the first and second delay units 240 and 250 are correct, the amount of delays of the first and second delay units 240 and 250 may be maintained. If the first frequency and the second frequency are not the same each other (or a difference between the first frequency and the second frequency exceeds the allowable error range), it may be determined that the amount of delays of the first and second delay units 240 and 250 are incorrect. If the amount of delays of the first and second delay units 240 and 250 are incorrect, the amount of delays of the first and second delay units 240 and 250 may be adjusted again. For example, the amount of delays of the first and second delay units 240 and 250 may be adjusted according to the method described with reference to FIG. 4.

In the above-described embodiments, components are referred to by using the term "block". A "block" may be implemented with various hardware devices, such as an integrated circuit (IC), an application specific IC (ASIC), a field programmable gate array (FPGA), and a complex programmable logic device (CPLD), software, such as firmware and applications driven in hardware devices, or a combination of a hardware device and software.

Figure 19:
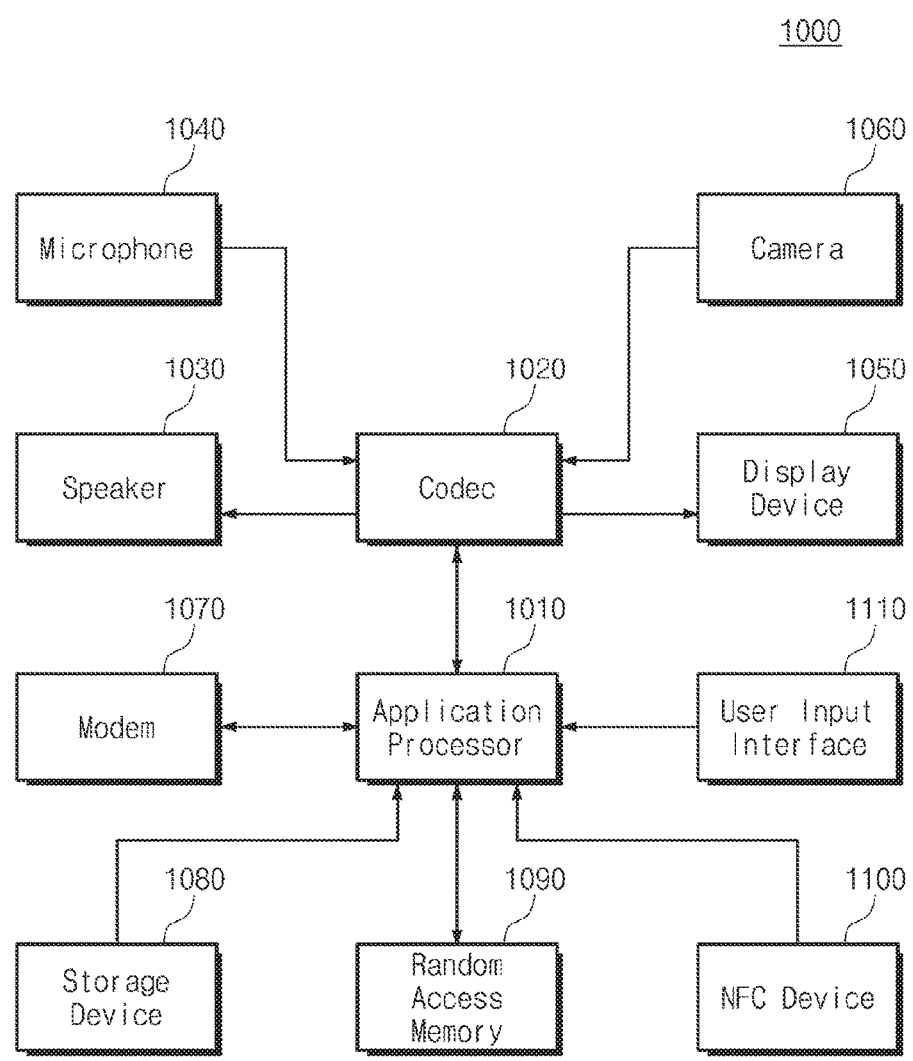
FIG. 19 is a block diagram illustrating a mobile device, according to an exemplary embodiment of the inventive concept.

FIG. 19 is a block diagram illustrating a mobile device 1000, according to an exemplary embodiment of the inventive concept. Referring to FIG. 19, the mobile device 1000 includes an application processor 1010, a codec 1020, a speaker 1030, a microphone 1040, a display device 1050, a camera 1060, a modem 1070, a storage device 1080, a random access memory 1090, and a NFC device 1100.

The application processor 1010 may drive an operating system for operating the mobile device 1000 and may drive various applications on the operating system. The codec 1020 may perform coding and decoding on a voice signal or an image signal. The codec 1020 may perform a task, which is associated with processing a voice signal or an image signal, while the task is delegated from the application processor 1010.

The speaker 1030 may play a voice signal transferred from the codec 1020. The microphone 1040 may detect a sound from the outside, may convert the detected sound into an electrical voice signal, and may output the voice signal to the codec 1020. The display device 1050 may play an image signal transferred from the codec 1020. The camera 1060 may convert a scene in a field of vision into an electrical image signal, and may output the image signal to the codec 1020.

The modem 1070 may communicate with an external device in a wired or wireless scheme. The modem 1070 may transfer data to an external device in response to a request of the application processor 1010 or may request data from the external device. The storage device 1080 may be main storage of the mobile device 1000. The storage device 1080 may be used to store data for a long time and may retain data stored therein even though power is removed therefrom. For example, the storage device 1080 may be a nonvolatile memory. The random access memory 1090 may be used as a main memory of the mobile device 1000. The random access memory 1090 may be used by the application processor 1010, the modem 1070, the codec 1020, etc., to temporarily store data.

The NFC device 1100 may include the NFC device 100 described with reference to FIGS. 1 to 18. The NFC device 1100 may operate in the reader mode or the card mode. The NFC device 1100 may perform the coarse training and the fine training to adjust a phase of a transmit signal. The NFC device 1100 may track a frequency change of an extracted clock and may adjust a phase of the transmit signal by oppositely applying a variation in a frequency upon transmitting the transmit signal.

A user input interface 1110 may include various devices that receive inputs from a user. For example, the user input interface 1110 may include devices, which receive an input directly from a user, such as a touch panel, a touch screen, a button, and a key pad or devices, which indirectly receive results generated by actions of the user, such as an optical sensor, a proximity sensor, a gyroscope sensor, and a pressure sensor.

According to an exemplary embodiment of the inventive concept, an NFC device automatically compensates for a phase difference between a receive signal and a transmit signal. Accordingly, the NFC device with increased communication quality and reduced manufacturing costs is provided.

While the inventive concept has been described with reference to exemplary embodiments thereof, it will be apparent to those skilled in the art that various changes and modifications may be made thereto without departing from the spirit and scope of the inventive concept. Therefore, it should be understood that the above embodiments are not limiting, but illustrative.

What is claimed is:

1. A near field communication (NFC) device, comprising:
an antenna;
a matching circuit connected to the antenna;
a clock extraction block configured to extract a clock from a signal received by the antenna and to output the extracted clock;
a frequency compensation block configured to compensate for a frequency of the extracted clock and to output a compensated clock; and
a modulation and amplification block configured to perform modulation and amplification by using the compensated clock and to output a transmit signal to the matching circuit,
wherein a first extracted clock has a first frequency that is extracted when the transmit signal is not output and a second extracted clock has a second frequency that is extracted when the transmit signal is output, and wherein the frequency compensation block compensates for the second frequency of the second extracted clock based on a difference between the first frequency of the first extracted clock and the second frequency of the second extracted clock.

2. The NFC device of claim 1, wherein the frequency compensation block compensates for the second frequency of the second extracted clock by adjusting the second frequency of the second extracted clock such that the second frequency corresponds to the first frequency.

3. The NFC device of claim 1, wherein the frequency compensation block compensates for the second frequency of the second extracted clock by adjusting the second frequency by adjusting an amount of delay of the second extracted clock.

4. The NFC device of claim 1, wherein the frequency compensation block includes:
a frequency detector configured to detect a frequency of the extracted clock and to output frequency information;
a delay unit configured to delay the extracted clock and to output the delayed clock as the compensated clock; and
logic configured to adjust an amount of delay of the delay unit based on the frequency information.

5. The NFC device of claim 4, wherein the delay unit includes:
a first delay unit configured to adjust an amount of delay of the extracted clock by a first unit; and
a second delay unit configured to delay an amount of delay of an output clock of the first delay unit by a second unit smaller than the first unit.

6. The NFC device of claim 5, wherein the first delay unit includes:
a delay array configured to output a plurality of clocks by delaying the extracted clock by the first unit;
a counter configured to adjust a count value; and
a selector configured to select and output a clock, which corresponds to the count value, from among the plurality of clocks.

7. The NFC device of claim 6, further comprising:
a divider configured to output a divided clock by dividing the frequency of the extracted clock,
wherein the counter adjusts the count value in synchronization with the divided clock.

8. The NFC device of claim 5, wherein when the second frequency is higher than the first frequency, the first delay unit increases the amount of delay of the second extracted clock by the second unit.

9. The NFC device of claim 8, wherein the first delay unit increases the amount of delay of the second extracted clock by the first unit until the second frequency is lower than the first frequency.

10. The NFC device of claim 5, wherein when the second frequency is not higher than the first frequency, the first delay unit outputs the second extracted clock without a delay.

11. The NFC device of claim 5, wherein when a frequency of the output clock of the first delay unit is lower than the first frequency, the second delay unit increases the amount of delay of the output clock of the first delay unit by the second unit.

12. The NFC device of claim 11, wherein the second delay unit increases the amount of delay of the output clock of the first delay unit by the second unit until the frequency of the output clock of the first delay unit is the same as the first frequency.

13. The NFC device of claim 4, wherein the frequency detector includes:
a delay unit configured to delay the extracted clock;
a logic element configured to perform an XNOR operation on the extracted clock and an output clock of the delay unit;
a filter configured to perform low pass filtering on an output of the logic element; and
an analog-to-digital converter configured to convert an output of the filter to the frequency information.

14. The NFC device of claim 13, wherein the delay unit delays the extracted clock by an amount of delay that is smaller than half a period of the extracted clock.

15. The NFC device of claim 13, wherein when the second frequency of the second extracted clock is higher than the first frequency of the first extracted clock, a second output voltage of the filter associated with the second frequency is larger than a first output voltage of the filter associated with the first frequency, and
wherein when the second frequency of the second extracted clock is lower than the first frequency of the first extracted clock, the second output voltage of the filter associated with the second frequency is smaller than the first output voltage of the filter associated with the first frequency.

16. The NFC device of claim 1, wherein when the signal is received by the antenna from an external device and the extracted clock starts to be extracted from the signal, the frequency compensation block detects a difference between the first frequency of the first extracted clock and the second frequency of the second extracted clock during an NFC guard time and obtains frequency compensation information associated with the second frequency.

17. The NFC device of claim 16, wherein during an NFC transmit time, the frequency compensation block outputs the compensated clock by using the obtained frequency compensation information, and
wherein the modulation and amplification block outputs the transmit signal by using the compensated clock.

18. The NFC device of claim 1, wherein if a frequency of the first extracted clock varies after an output of the transmit signal stops, the frequency compensation block compensates for the second frequency of the second extracted clock by changing a frequency of the extracted clock to be opposite the frequency of the first extracted clock when outputting a next transmit signal.

19. A near field communication device, comprising:
an antenna;
a matching circuit connected to the antenna;
a clock extraction block configured to extract a clock from a signal of the matching circuit and to output the extracted clock;
a frequency compensation block configured to compensate for a frequency of the extracted clock and to output a compensated clock; and
a modulation and amplification block configured to perform modulation and amplification by using the compensated clock and to output a transmit signal to the matching circuit and the antenna,
wherein the frequency compensation block includes:
a frequency detector configured to detect a first frequency of a first extracted clock extracted when the transmit signal is not output and a second frequency of a second extracted clock extracted when the transmit signal is output;

a first delay unit configured to increase an amount of delay of the second extracted clock when the second frequency is higher than the first frequency; and a second delay unit configured to decrease an amount of delay of an output clock of the first delay unit when a frequency of the output clock of the first delay unit is lower than the first frequency.

20. An operating method of a near field communication device, the method comprising:

receiving a first signal through an antenna and a matching circuit;

extracting a first clock from the first signal;

detecting a first frequency of the first clock;

transmitting a second signal while the first signal is received;

extracting a second clock from the second signal;

detecting a second frequency of the second clock; and adjusting an amount of delay of the second clock such that the second frequency corresponds to the first frequency.

* * * * *